US006915042B2

(12) United States Patent
Labidi et al.

(10) Patent No.: US 6,915,042 B2
(45) Date of Patent: Jul. 5, 2005

(54) SLANTED BRAGG GRATING OPTICAL FIBER AND PROCESS FOR MANUFACTURING SUCH A FIBER

(75) Inventors: Hedi Labidi, Paris (FR); Carlos De Barros, Boulogne-Billancourt (FR); Isabelle Riant, Orsay (FR)

(73) Assignee: Avanex Corporation, Fremont, CA (US)

( * ) Notice: Subject to any disclaimer, the term of this patent is extended or adjusted under 35 U.S.C. 154(b) by 183 days.

(21) Appl. No.: 10/217,426

(22) Filed: Aug. 14, 2002

(65) Prior Publication Data

US 2003/0035627 A1 Feb. 20, 2003

(30) Foreign Application Priority Data

Aug. 16, 2001 (EP) ............................................ 01440264

(51) Int. Cl.[7] ................................................ G02B 6/34
(52) U.S. Cl. ...................................... 385/37; 359/341.1
(58) Field of Search ....................... 385/10, 37; 398/84, 398/87; 359/341.1–341.5

(56) References Cited

U.S. PATENT DOCUMENTS

| 6,069,985 | A | * | 5/2000 | Albin et al. | 385/12 |
| 6,211,957 | B1 | * | 4/2001 | Erdogan et al. | 356/364 |
| 6,490,078 | B2 | * | 12/2002 | Enomoto et al. | 359/341.1 |
| 6,591,024 | B2 | * | 7/2003 | Westbrook | 385/11 |
| 2004/0179797 | A1 | * | 9/2004 | Po et al. | 385/123 |

FOREIGN PATENT DOCUMENTS

| EP | 0855608 A1 | 7/1998 |
| EP | 1022595 A1 | 7/2000 |
| WO | WO 01/02885 | 1/2001 |

OTHER PUBLICATIONS

Isabelle Riant et al, "36NM Amplifier Gain Equalizer based on Slanted Bragg Grating Technology for Multichannel Transmission", pp. 551–554, SubOptic 2001.

Kyung Shik Lee, et al., "Fiber Mode Conversion With Tilted Gratings In An Optical Fiber", Journal of the Optical Society of America—A., Optical Society of America, Washington, U.S. vol. Right–Hand Column—p. 1183; FIGS. 7,8.

Parker R., et al., "Reduced Cladding Mode Losses In Tilted Gratings That Are Rotationally Symmetric," Journal of Lightwave Technology, Dec. 2000, IEEE, U.S.A., vol. 18, No. 12, pp. 2133–2138, XP002190943, ISSN: 0733–8724, pp. 2133–2134.

Kashyap R., et al., "Widebank Gain Flattened Erbium Fibre Amplifier Using A Photosensitive Fibre–Blazed Grating," Electronics Letter, IEE Stevenage, GB, vol. 29, No. 2, Jan. 21, 1993, pp. 154–156, XP000331632, ISSN: 0013–5194, The Whole Document.

Mihailov, S. J., et al., "Fabrication of Tilted Fibre–Grating Polarisation–Dependent Loss Equaliser", Electronics Letters, IEE Stevenage, GB, vol. 37, No. 5, Mar. 1, 2001, pp. 284–286, XP006016314, ISSN: 0013–5194 Abstract, FIG. 1.

* cited by examiner

Primary Examiner—Edward J. Glick
Assistant Examiner—Thomas R Artman

(57) ABSTRACT

The present invention relates to the field of optical fiber telecommunications. More specifically, the subject of the invention is a slanted Bragg grating optical fiber and a process for manufacturing such a fiber. The slanted Bragg grating optical fiber of longitudinal axis Z has slanted Bragg gratings photowritten in said fiber and having refractive index modulations along said axis Z, inclined at a same writing angle with respect to a normal plane to said axis Z and defining planes called writing planes forming the same angle than the writing angle with said normal plane, each writing plane forming with others writing planes specific angles called angles of rotation about said axis Z.

25 Claims, 5 Drawing Sheets

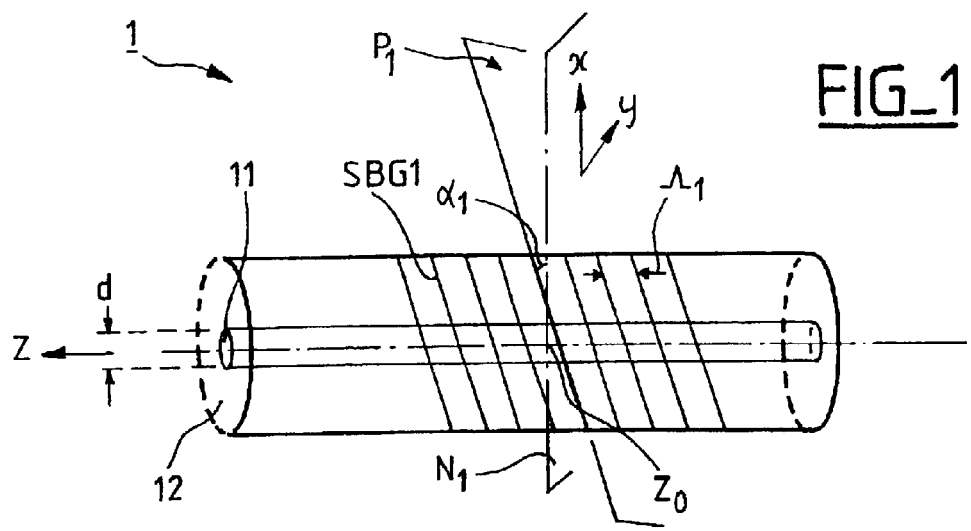
FIG_1
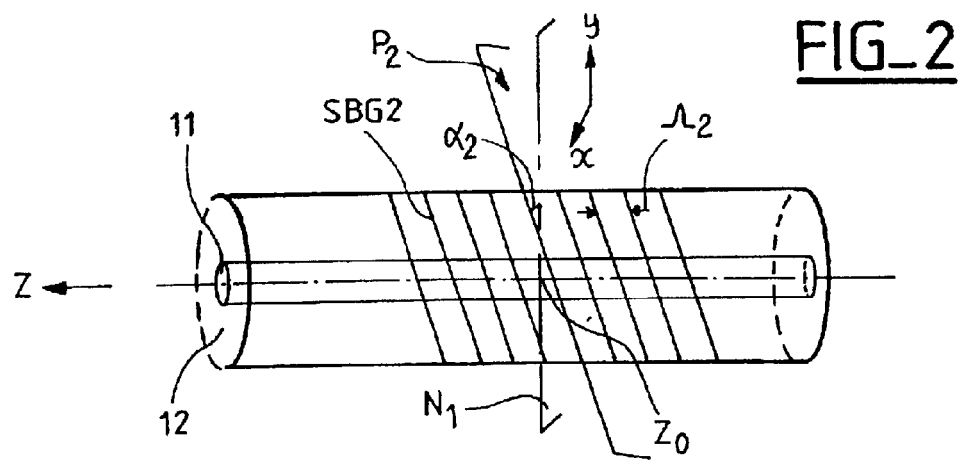
FIG_2
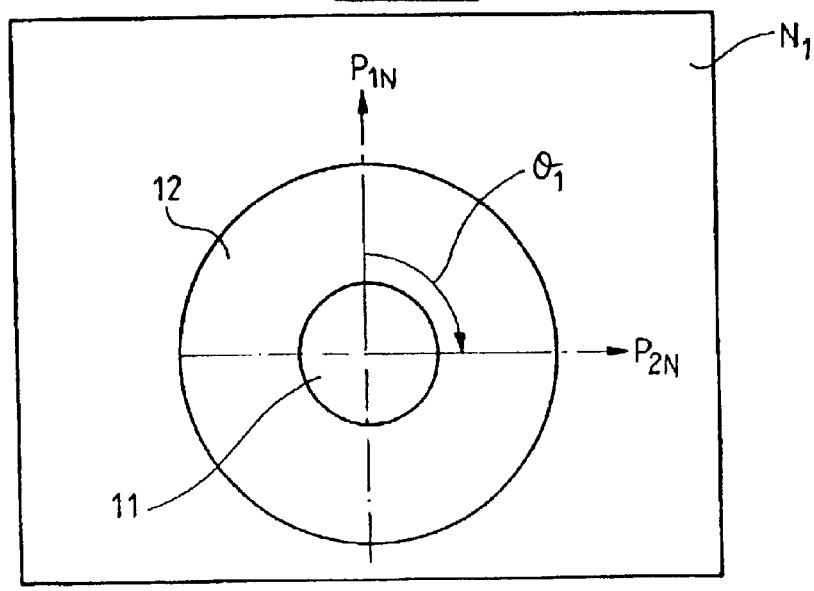
FIG_3

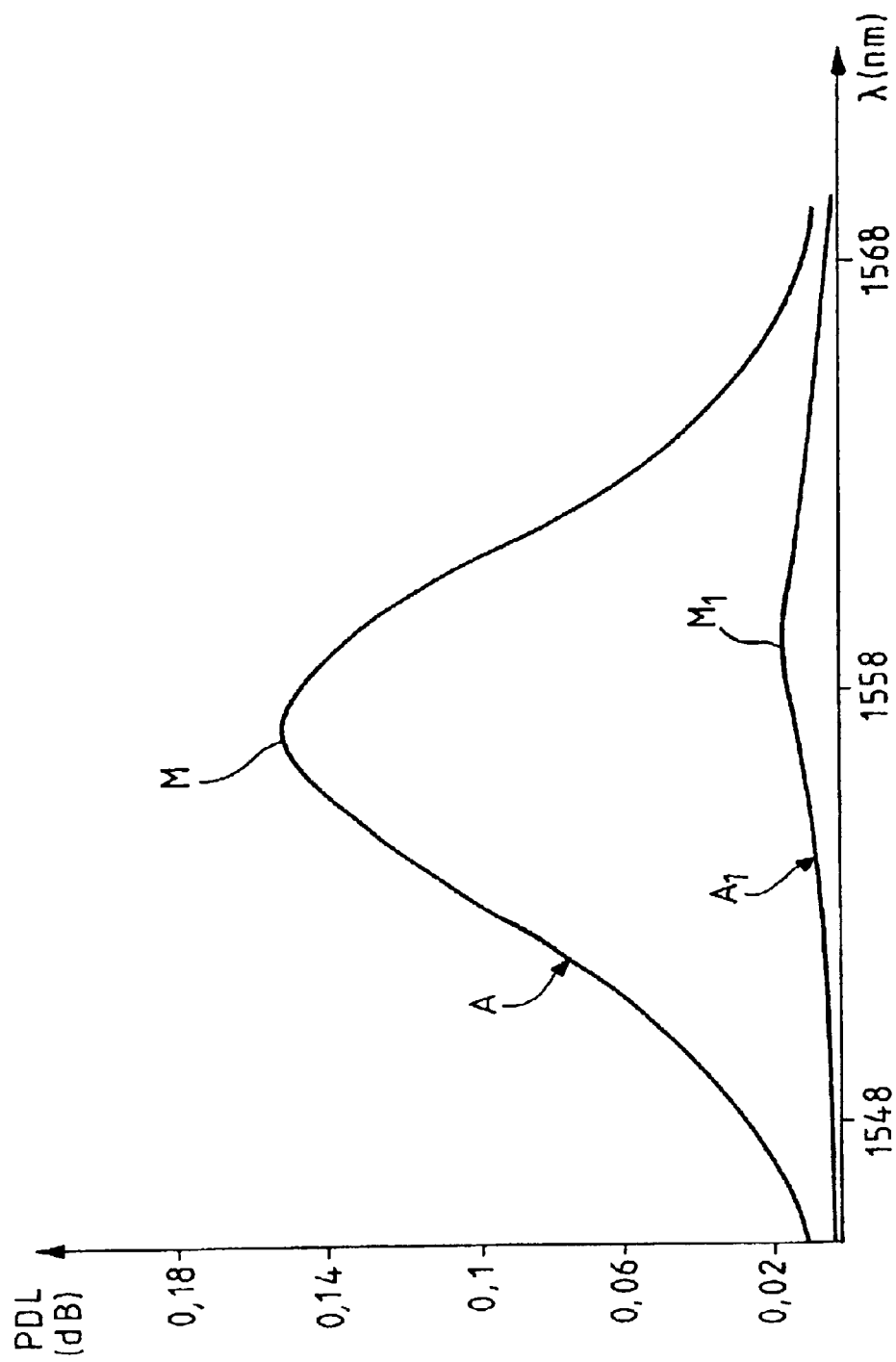

FIG_5
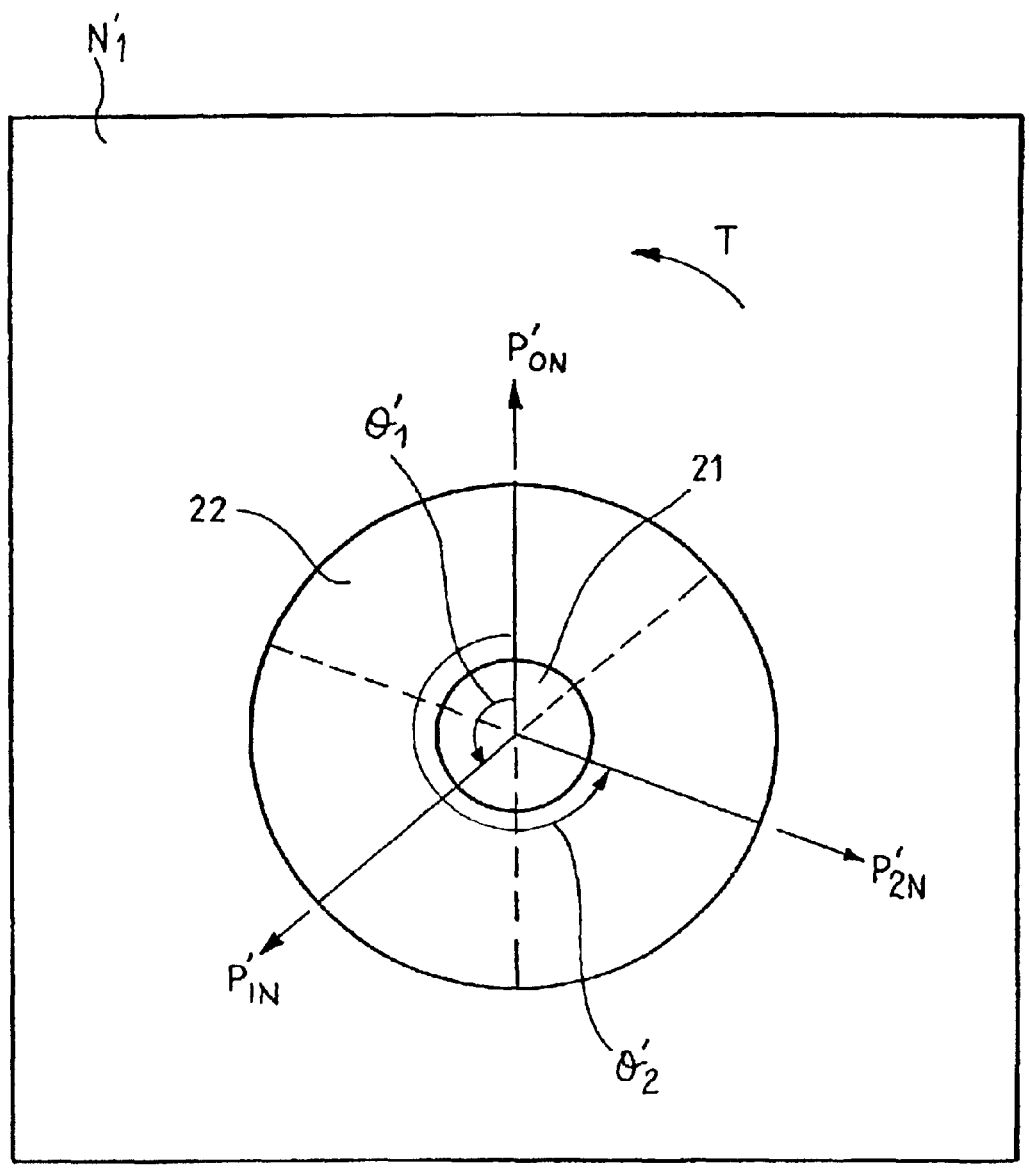

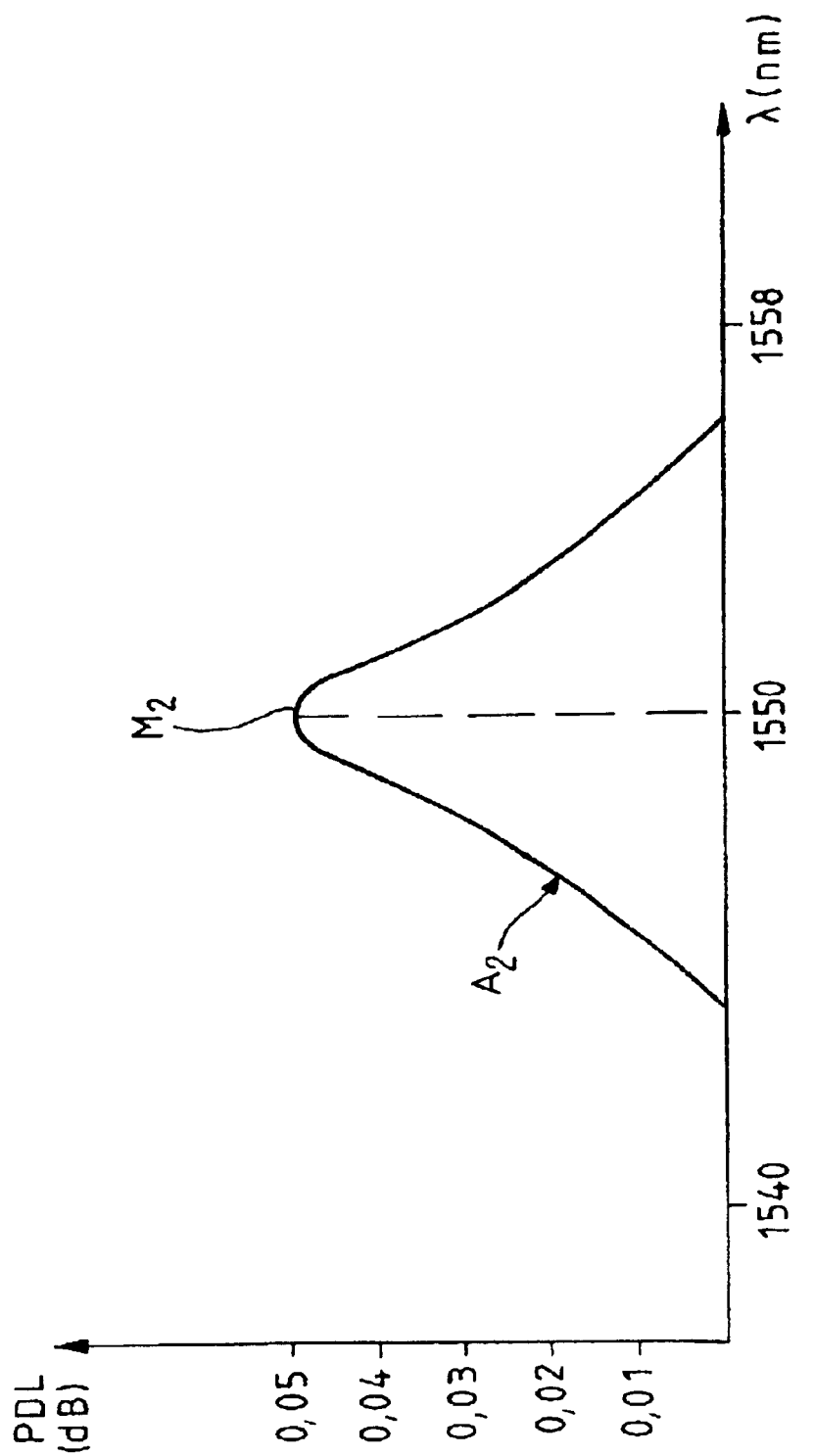
FIG_6

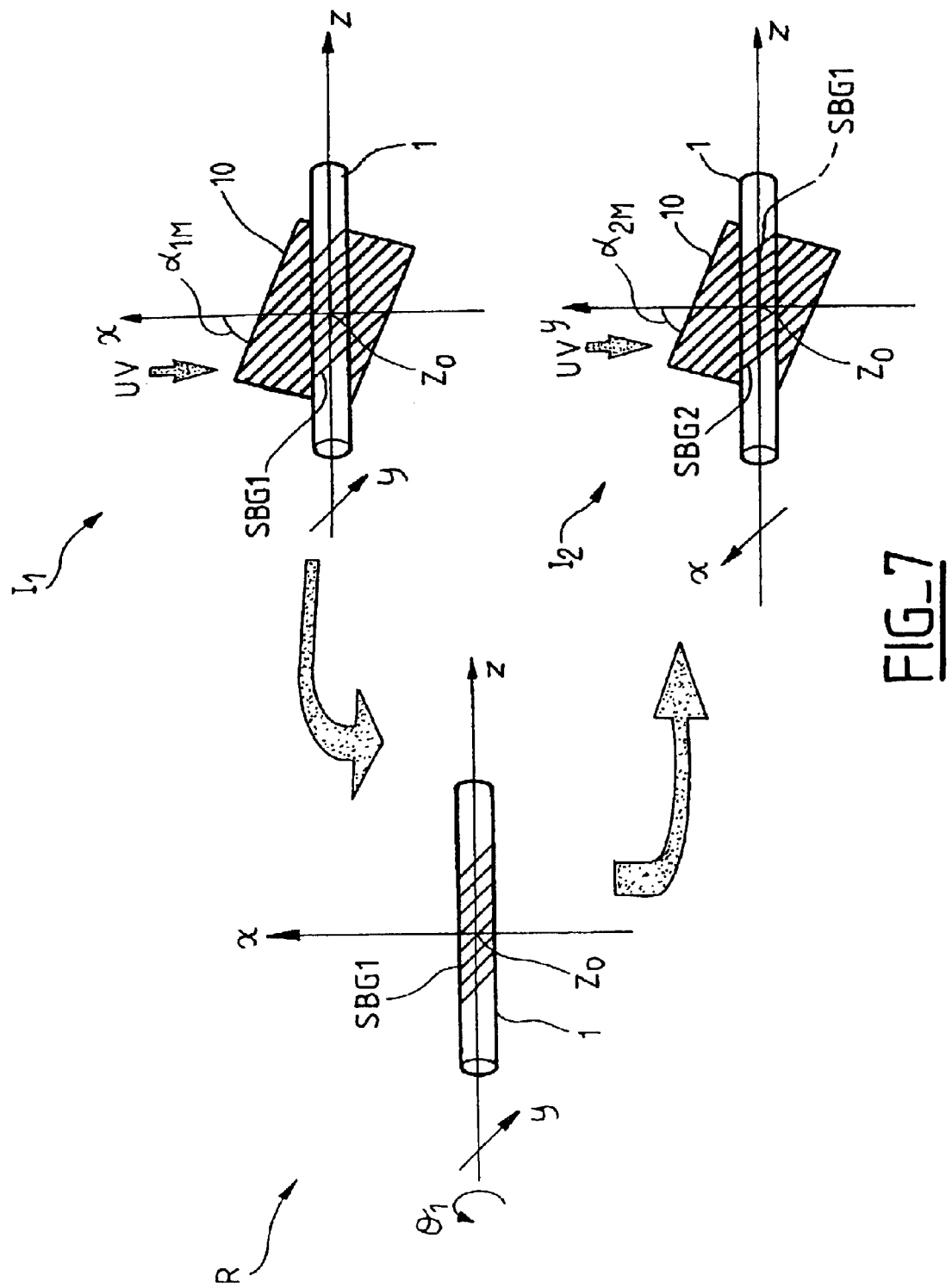
FIG_7

SLANTED BRAGG GRATING OPTICAL FIBER AND PROCESS FOR MANUFACTURING SUCH A FIBER

BACKGROUND OF THE INVENTION

The invention is based on a priority application EP 01 440 264.8 which is hereby incorporated by reference.

The present invention relates to the field of optical fiber telecommunications. More specifically, the subject of the invention is a slanted Bragg grating optical fiber and a process for manufacturing such a fiber.

It is known to try to flatten the gain of optical amplifiers, such as erbium-doped fiber amplifiers, generally used along multichannel long-haul optical links. This is because the profile of the gain as a function of wavelength of such amplifiers is not constant, certain components being preferentially amplified.

Bragg grating fibers are known in the field of filtering optical fibers. A Bragg grating is formed by approximately periodic modulations of the refractive index in the core and/or in one or more claddings of the generally monomode fiber, said modulations being obtained by irradiation of the fiber by means of UV beams, also called UV exposure. The period of the grating, that is to say the period of modulation of the index along the fiber, i.e. along its longitudinal axis, and the modulation amplitude fix the spectral response of the grating.

When the index variations are inclined at a writing angle α with respect to a normal plane to the fiber axis an SBG (Slanted Bragg Grating) is formed.

Patent application EP-0855608 discloses one method of producing an SBG used in transmission and intended to compensate for a lack of flatness around 1558 nm of a broadband EDFA optical amplifier. The SBG has the advantage of being non reflecting at filtering wavelengths as a long period Bragg grating (LPG) and is less sensitive to temperature variations and fiber bending than a LPG.

The inclination of the period at a nonzero writing angle α has the effect of coupling the copropagating fundamental mode which propagates in the core of the fiber to the dissipative cladding contrapropagating modes. The transmission spectrum of the SBG therefore corresponds to a spectral envelope of all of the components associated with these various cladding modes. This results in dissipation of the guided optical power in the fiber, manifested by a selective attenuation of the transmitted signals. It is possible in this way to correct the overamplifications at certain wavelengths of the optical amplifier.

Depending on the length of the fiber section exposed to the UV radiation, on the value of the period along this section, on the intensity and the angle of the exposure and the fiber profile, the following transmission characteristics may be modified: the bandwidth, the central wavelength, which is slightly less than the Bragg wavelength, and the amplitude of the selective attenuation. These parameters are set depending on the desired equalization and the transmission window of the telecommunication system involved.

As an example, the document entitled "36-nm Amplifier Gain Equalizer Based On Slanted Bragg Grating Technology For Multichannel Transmission" published in SubOptic 2001, Japan, P 4.3.10 discloses three SBGs cascaded randomly disposed around the fiber axis and one after another. Each grating has different characteristics (writing angle, period) from the other gratings so as to adjust the desired gain equalization.

However, these SBGs of the prior art have the drawback of being sensitive to the state of polarization of the fundamental propagation mode $LP_{01}$. More specifically, they involve losses linked to the polarization state denoted by the name PDL (Polarization-Dependant Loss). It is possible to define the PDL as the difference in attenuation between an s-type polarization and a normal p-type polarization in the transverse plane of the electric field E of the $LP_{01}$ mode. The PDL losses are different depending on the wavelength: the PDL spectrum as a function of wavelength has a peak and a width substantially equal to the width of the SBG transmission spectrum. Thus, the SBG transmission spectrum is linked to the state of polarization of the $LP_{01}$ mode.

It is known that the larger is the PDL the larger is the angle of writing α of the SBG. Likewise, the higher is the level of attenuation introduced by the SBG so-called contrast, the higher is the PDL. At the present time, the PDL of an SBG inclined at approximately 7.2° is, for example, 0.26 dB around 1552 nm for a contrast of −3.5 dB. In this case, the PDL spectrum has a width at mid-height of the order of 16 nm.

Endeavors are being made to reduce the PDL especially for the next generations of gain equalizers intended to be used on very long-haul submarine links.

SUMMARY OF THE INVENTION

It is an object of the present invention to develop a slanted Bragg grating optical fiber which is not very sensitive to the state of polarization of the fundamental propagation mode of the fiber, that is to say having a PDL lower than the prior art, whatever the wavelength.

For this purpose, the invention provides a slanted Bragg grating optical fiber comprising:
  an optical fiber of longitudinal axis Z,
  a slanted Bragg grating called first SBG photowritten in said fiber and having refractive index modulations along said axis Z, of period $\Lambda_1$, inclined at a writing angle $\alpha_1$ with respect to a normal plane to said axis Z and defining a plane called first writing plane forming an angle $\alpha_1$ with said normal plane,
  a second slanted Bragg grating, called second SBG, photowritten in said fiber and having refractive index modulations along said axis Z, of period $\Lambda_2$, inclined at a writing angle $\alpha_2$ with respect to said normal plane and defining a plane called second writing plane forming an angle $\alpha_2$ with said normal plane,
  wherein said periods $\Lambda_1$ and $\Lambda_2$ and said angles $\alpha_1$ and $\alpha_2$ are substantially identical and in that the angle $\theta_1$ between said first and second writing planes about said axis Z called the rotation angle, is between 60° and 120°.

By virtue of the invention, the optical fiber according to the invention has a lower PDL than the prior art. Whatever the polarization state in the transverse plane of the $LP_{01}$ mode, this state can be decomposed in p polarization and s polarization. The two gratings according the invention, arranged in this way and having identical characteristics, acts in p polarization and s polarization substantially in a similar proportion. Thus, the polarization state has less influence on the intensity of the coupling with the cladding modes.

Furthermore, in the prior art, the PDL of two SBGs has generally, in common wavelength, a maximal intensity higher than the PDL of one of each SBG. Unlike the prior art, PDL of the combined two SBGs according the invention is significantly lower than the PDL of one of each SBG. Therefore, we can say that one SBG compensate the PDL of the other SBG.

Advantageously, said angle of rotation $\theta_1$ may be approximately equal to 90°.

The longitudinal axis Z is also the axis of propagation of the light. In this configuration, the intersection between the first writing plane and the normal plane is a first axis which may support an s-type polarization mode and the intersection between the second writing plane and the normal plane is a normal axis to the first one which may support a p-type polarization mode. By thus making the coupling between the $LP_{01}$ mode and the cladding modes almost identical for the p and s polarizations, the PDL correction is optimal whatever the polarization state of the $LP_{01}$ mode.

The present invention also provides a slanted Bragg grating optical fiber comprising:

an optical fiber of longitudinal axis Z, a number N strictly greater than 2 of slanted Bragg gratings called SBG'n photowritten in said fiber, each SBG'n being identified by an index n between 0 and N−1, having refractive index modulations along said axis Z, of period $\Lambda'_n$, which are inclined at a writing angle $\alpha'_n$ with respect to a normal plane to said axis Z, defining a plane called writing plane $P'_n$ forming an angle $\alpha'_n$ with said normal plane, wherein all said periods $\Lambda'_n$ and said writing angles $\alpha'_n$ are substantially identical and in that each writing plane $P'_n$ forms with the writing plane $P'_0$, an angle $\theta'_n$ about said axis Z called angle of rotation and following a given orientation, said angle $\theta'_n$ is given in degrees by the equation:

$$\theta'_n = n360/N \pm 20/N.$$

In a manner similar to the optical fiber having two SBGs according to the invention, the optical fiber having N SBGs according to the invention has a PDL spectrum of very low amplitude, whatever the wavelength. In order to explain the invention, let us consider an orthonormal coordinate system with axes x, y and z, the z axis being the axis of propagation of the light, identified with the axis Z of the fiber and y axis being identified with the intersection between the writing plane $P'_0$ and the normal plane to Z axis. It may be seen that the sums in absolute values of the respective contributions of the coupling of each SBG along the x axis and along the y axis are substantially equal. Thus, a same attenuation level is obtained for two signals of a same wavelength and with a different polarization state of the $LP_{01}$ mode.

Unlike the prior art, the PDL spectrum of the combined N SBGs according the invention has a maximal intensity lower than the PDL of one SBG.

According to the invention, the SBGs are either substantially centered on the same abscissa along the axis Z or are centered on substantially different abscissae along the axis Z.

It is possible not to translate the fiber during the manufacturing in order to write the SBGs in the same abscissa so as to reduce the number of manufacturing steps.

Nevertheless, if the number of SBGs to write is high we can shift the writing along the fiber axis.

Preferably, the writing angles may be between 0.1° and 20°.

In one embodiment of the invention, the SBGs have a substantially identical variation of said period along the axis Z, the variation being of the linear type.

The linear variation $\delta\Lambda$ is generally between 0.5 and 20 nm/cm. The transmission spectrum of an SBG corresponds to an envelope of filtering maxima resulting from the combination of discrete filters of relatively narrow width. Using an SBG of longitudinally linear variable period, it is possible to smooth out the transmission spectrum as described in the document EP-1022595.

To a known process described in patent application EP-0 855 608, an SBG is obtained by causing two UV beams irradiating a section of an optical fiber—core and cladding—to interfere, the bisector of the angle between the two beams inclined at an angle with respect to the normal to the fiber axis giving the inclination of the period of the grating. Another possibility already known consists in using a phase mask inclined generating mainly two orders of diffraction, +1 and −1, and a very low zero order.

The subject of the present invention is also a process for manufacturing an optical fiber according to the invention.

Advantageously, the process according to the invention may comprise one photowriting step per SBG in the fiber by irradiation according to an irradiation axis and a step of rotation, about said axis Z, of said fiber with respect to said irradiation axis by an angle of swiveling following a given orientation and substantially equal to said angle of rotation $\theta_1$ or $\theta'_1$ between each photowriting step.

Most of the time, irradiation is a UV irradiation.

In one method of implementing the process, said irradiation axis is stationary during said rotation step.

Furthermore, the process according to the invention may include, at least between two successive photowriting steps, a step of translating the fiber along the axis Z by a translation length substantially less than 1 m.

When the value of the translation length are low, the polarization state of $LP_{01}$ mode between the farer SBG may not change so that the PDL reduction operating by the combined SBG according the invention is optimal.

According to the invention, the irradiation may be either associated with a phase mask or may comprise two light beams, the irradiation axis then corresponding to the bisector of the angle between the beams.

BRIEF DESCRIPTION OF THE DRAWINGS

The characteristics and objects of the present invention will become apparent from the detailed description given below with regard to the appended figures, which are presented by way of illustration but in no way imply limitation.

In these figures:

FIG. 1 shows a schematic side view of a slanted Bragg grating optical fiber according to the invention in a first embodiment;

FIG. 2 shows another schematic side view of the optical fiber of FIG. 1;

FIG. 3 shows a schematic cross-sectional view of the optical fiber of the first embodiment;

FIG. 4 shows the PDL spectra as a function of wavelength of the two SBGs of the optical fiber of the first embodiment and of an SBG of a slanted Bragg grating optical fiber in previous state of art;

FIG. 5 shows a schematic cross-sectional view of a slanted Bragg grating optical fiber according to the invention in a second embodiment;

FIG. 6 shows the PDL spectrum as a function of wavelength of the three SBGs of the optical fiber of FIG. 5; and FIG. 7 shows schematically a process for manufacturing a slanted Bragg grating optical fiber according the first embodiment of the invention.

In all these figures, the common elements, that is to say the elements which fulfill the same function, are denoted by the same reference numbers.

FIGS. 1, 2 show two schematic side views of a slanted Bragg grating optical fiber 1 according to the invention in a first embodiment. The fiber 1 is, for example, intended to compensate for the lack of gain flatness around 1558 nm of an EDFA optical amplifier.

The optical fiber 1 of longitudinal axis Z along which the light propagates has a silica-based core 11 of diameter d between 5 and 10 µm and surrounding said core at least one silica-based cladding of diameter D between 10 and 200 µm and of lower refractive index than that of the core 11. In addition, the core 11 and a part of the cladding 12 contain photosensitive dopants of the germanium type. A normal plane $N_1$ to Z axis contains axes x et y.

The fiber 1 also comprises:

a first slanted Bragg grating SBG1 photowritten in the core 11 and the part of the cladding 12, having refractive index modulations along the axis Z, of period $\Lambda_1$ between 0,2 and 0,7 µm inclined at a writing angle $\alpha_1$ with respect to the normal plane $N_1$ to the axis Z equal to approximately 7.2° and defining a plane called first writing plane $P_1$ forming a angle $\alpha_1$ with the normal plane;

a second slanted Bragg grating SBG2 photowritten in the core 11 and the part of the cladding 12, having refractive index modulations along the axis Z, of period $\Lambda_2$ substantially equal to $\Lambda_1$, inclined at a writing angle $\alpha_2$ substantially equal to $\alpha_1$ with respect to the normal plane $N_1$, and defining called second writing plane $P_2$ forming a angle $\alpha_2$ with the normal plane.

The gratings SBG1 and SBG2 are substantially centered on the same abscissa $Z_0$ along the axis Z.

The gratings SBG1 and SBG2 may have a linear variation in period δΛ around 10 nm/cm along the axis Z. More over, the length of each grating SBG1, SBG2 is equal to approximately 6 mm.

An angle called the angle of rotation $\theta_1$ about Z axis between the first and second writing planes $P_1$ and $P_2$ is roughly equal to 90°.

FIG. 3 shows a schematic cross-sectional view of the optical fiber of the first embodiment.

The angle of rotation $\theta_1$ is represented in FIG. 3 by the angle between the intersection $P_{1N}$ of $P_1$ and normal plane $N_1$ to said axis Z and the intersection $P_{2N}$ of $P_2$ and the normal plane $N_1$.

FIG. 4 shows two curves A and $A_1$ respectively representing the PDL spectrum (in dB) as a function of wavelength (in nm) of a comparative SBG of a slanted Bragg grating optical fiber of the previous art and of the two gratings SBG1, SBG2 of the optical fiber 1.

Comparative SBG has a period equal to $\Lambda_1$ and a writing angle equal to $\alpha_1$.

The transmission spectra of the comparative SBG and of the combined gratings SBG1, SBG2 have a central wavelength $\lambda_c$ equal to approximately 1558 nm and a corresponding attenuation of the order of −3 dB.

The PDL spectrum of curve A has a maximum M equal to approximately 0.15 dB at the central wavelength $\lambda_c$ and a width at mid-height equal to approximately 10 nm.

The PDL spectrum of curve $A_1$ has a maximum $M_1$ equal to approximately 0.02 dB at the central wavelength $\lambda_c$. On each side of $\lambda_c$, the PDL of the fiber 1 is virtually zero.

FIG. 5 shows a schematic cross-sectional view of an optical fiber 2 according to the invention in a second embodiment.

The optical fiber 2 of longitudinal light propagation axis Z has a silica-based core 21 of diameter d approximately between 5 and 10 µm and, surrounding said core, at least one silica-based cladding of diameter D between 10 and 200 µm and of lower refractive index than that of the core 21.

In addition, the core 21 and a part of the cladding 22 contain photosensitive dopants of the germanium type. A normal plane $N'_1$ to Z axis contains axes x et y.

The fiber 2 also has three slanted Bragg gratings SBG'0, SBG'1, SBG'2.

The grating SBG'0, SBG'1, SBG'2 have refractive index modulations along the axis Z, of period $\Lambda'_0$, $\Lambda'_1$, $\Lambda'_2$ substantially identical and between 0,2 µm and 0,7 µm, inclined at a writing angle $\alpha'_0$, $\alpha'_1$, $\alpha'_2$ substantially identical and equal to approximately 7.2° with respect to the normal plane $N'_1$, defining a writing plane $P'_0$, $P'_1$, $P'_2$ forming an angle $\alpha'_0$, $\alpha'_1$, $\alpha'_2$ with the normal plane $N'_1$ to said axis Z.

The writing planes $P'_1$, $P'_2$ form with the writing plane $P'_0$, respective angles of rotation $\theta'_1$, $\theta'_2$ about said axis Z, respectively equals to 120° and 240°, following a same orientation T for example counterclockwise.

The angle of rotation $\theta'_1$ is represented in FIG. 5 by the angle between the intersection $P'_{1N}$ of $P'_1$ and normal plane $N'_1$ and the intersection $P'_{0N}$ of $P'_0$ and normal plane $N'_1$.

The angle of rotation $\theta'_2$ is represented in FIG. 5 by the angle between the intersection $P'_{2N}$ of $P'_2$ and normal plane and the intersection $P'_{0N}$.

By projecting each intersection $P'_{0N}$, $P'_{1N}$, $P'_{2N}$ onto the x and y axes (projections not shown), we show that the sum in absolute value of the coupling contributions of each grating SBG'0, SBG'1, SBG'2 along the x axis and along the y axis are equal.

Furthermore, the gratings SBG'0, SBG'1, SBG'2 are centered on a same abscissa $Z_1$ along the axis fiber 2.

The gratings SBG'0, SBG'1, SBG'2 have a linear variation in period δΛ' of 10 nm/cm along said axis Z.

FIG. 6 shows a curve $A_2$ representing the PDL spectrum (in dB) as a function of wavelength (in nm) of the gratings SBG'0, SBG'1, SBG'2 of the optical fiber 2.

The transmission spectrum of the gratings SBG'0, SBG'1, SBG'2 has a central wavelength $\lambda_{c2}$ equal to approximately 1550 nm and a corresponding attenuation of the order of −6 dB.

The PDL spectrum of curve $A_2$ has a maximum $M_2$ equal to approximately 0.05 dB at the central wavelength $\lambda_{c2}$. On each side of this wavelength, the PDL of the gratings SBG'0, SBG'1, SBG'2 is very low.

FIG. 7 shows schematically a process for manufacturing according to the invention an optical fiber such as the fiber 1 of the first embodiment of the invention.

This process comprises the following steps:

a first step $I_1$ of photowriting the first slanted Bragg grating SBG1 in the fiber 1 containing photosensitive dopants;

a subsequent step of rotation R of the fiber 1 about the axis Z by an angle called the angle of swiveling $\theta_1$ approximately equal to 90°;

a second step $I_2$ of photowriting the second slanted Bragg grating SBG2 in the fiber 1.

Each photowriting step $I_1$, $I_2$ is conventionally carried out using a phase mask 10 combined with ultraviolet irradiation UV of wavelength equal to approximately 250 nm giving a mask angle $\alpha_{1M}$, $\alpha_{2M}$ with respect to a normal plane to the axis Z containing two axis x, y equal to approximately 4.9° corresponding to a writing angle of 7.20 in the fiber. The duration of step $I_1$, $I_2$ is a few minutes.

Another possibility already known consists in causing two UV beams coming from a frequency-doubled ultraviolet irradiation to interfere. In this case, the irradiation axis corresponds to the bisector of the angle between the beams.

During the step of rotation R, the fiber 1 rotates about the axis Z.

Likewise, it may be envisioned to dispense with the rotation step by using two perpendicular ultraviolet irradiation sources or only one source with a set of mirrors so as to irradiate the two gratings SBG1, SBG2 at the same time.

To manufacture the optical fiber 2 having three gratings SBG'0, SBG'1, SBG'2, the process described above is applied by adjusting the angle of swiveling $\theta'_1$ and by adding another rotation and writing steps.

Furthermore, to manufacture an SBG fiber according the invention it is possible to add after each rotation step an additional step of translation along the axis Z of the fiber over a suitable translation length.

What is claimed is:

1. Slanted Bragg grating optical fiber comprising:
   an optical fiber of longitudinal axis Z;
   a slanted Bragg grating, called first SBG, photowritten in said fiber and having refractive index modulations along said axis Z, of period $\Lambda_1$, which are inclined at a writing angle $\alpha_1$ with said normal planet: and
   a second slanted Bragg grating, called second SBG, photowritten in said fiber and having refractive index modulations along said axis Z, of period $\Lambda_2$, which are inclined at a writing angle $\alpha_2$ with respect to said normal plane and defining a plane called second writing plane forming an angle $\alpha_2$ with said normal plane,
   wherein said periods $\Lambda_1$ and $\Lambda_2$ and said writing angles $\alpha_1$ and $\alpha_2$ are substantially identical, said writing angles being between 0.1° and 20°, and an angle $\theta_1$ between said first and second writing planes, about said axis, called the rotation angle, is between 60° and 120°.

2. Optical fiber according to claim 1, wherein said angle of rotation $\theta_1$ is approximately equal to 90°.

3. Optical fiber according to claim 1, wherein said SBGs are substantially centered on the same abscissa along said axis Z.

4. Optical fiber according to claim 1, wherein said SBGs are centered on substantially different abscissae along said axis Z.

5. Optical fiber according to claim 1, wherein said SBGs have a substantially identical variation of said period along said axis Z, the variation being of the linear type.

6. Optical fiber according to claim 1, wherein said SBGs are configured to attenuate at least one wavelength of a composite signal by the order of −3 to −6 dB.

7. Optical fiber according to claim 1, wherein said periods $\Lambda_1$ and $\Lambda_2$ are equal to between 0.2 and 0.7 μm.

8. Optical fiber according to claim 1, wherein a length of each of said SBGs is equal to approximately 6 mm.

9. Optical fiber according to claim 1, wherein said SBGs are configured so that a polarization dependent loss incurred by a signal transmitted through the optical fiber is less than or equal to approximately 0.15 dB.

10. Slanted Bragg grating optical fiber comprising:
    an optical fiber of longitudinal axis Z; and
    a number N strictly greater than 2 of slanted Bragg gratings, called SBG'n, photowritten in said fiber, each SBG'n being identified by an index n of between 0 and N-1, having refractive index modulations along said axis Z, of period $\Lambda'_n$, which are inclined at a writing angle $\alpha'_n$ with respect to a normal plane to said axis Z, and defining a plane called writing plane $P'_n$ forming a angle $\alpha'_n$ with said normal plane,
    wherein all said periods $\Lambda'_n$ and said writing angles $\alpha'_n$ are substantially identical and in that each writing plane $P'_n$ forms with the writing plane $P'_0$, an angle $\theta'_n$ about said axis Z called angle of rotation and following a given orientation, said angle $\theta'_n$ is given in degrees by the equation:

$$\theta'_n = n360/N \pm 20/N.$$

11. Optical fiber according to claim 10, wherein said SBGs are configured to attenuate at least one wavelength of a composite signal by the order of −6 dB.

12. Optical fiber according to claim 10, wherein said SBGs are substantially centered on the same abscissa along said axis Z.

13. Optical fiber according to claim 10, wherein said SBGs are centered on substantially different abscissae along said axis Z.

14. Optical fiber according to claim 10, wherein said writing angles are between 0.1° and 20°.

15. Optical fiber according to claim 10, wherein said SBGs have a substantially identical variation of said period along said axis Z, the variation being of the linear type.

16. Optical fiber according to claim 10, wherein said periods $\Lambda_1$ and $\Lambda_2$ are equal to between 0.2 and 0.7 μm.

17. Optical fiber according to claim 10, wherein a length of each of said SBGs is equal to approximately 6 mm.

18. Optical fiber according to claim 10, wherein said SBGs are configured so that a polarization dependent loss incurred by a signal transmitted through the optical fiber is less than or equal to approximately 0.05 dB.

19. Slanted Bragg grating optical fiber comprising:
    an optical fiber of longitudinal axis Z;
    a slanted Bragg grating, called first SBG, photowritten in said fiber and having refractive index modulations along said axis Z, of period $\Lambda_1$, which are inclined at a writing angle $\alpha_1$ with said normal plane; and
    a second slanted Bragg grating, called second SBG, photowritten in said fiber and having refractive index modulations along said axis Z, of period $\Lambda_2$, which are inclined at a writing angle $\alpha_2$ with respect to said normal plane and defining a plane called second writing plane forming an angle $\alpha_2$ with said normal plane,
    wherein said periods $\Lambda_1$ and $\Lambda_2$ and said angles $\alpha_1$ and $\alpha_2$ are substantially identical, an angle $\theta_1$ between said first and second writing planes, about said axis, called the rotation angle, is between 60° and 120°, and SBGs are configured to attenuate at least one wavelength of a composite signal so as to correct for over-amplification by an amplifier.

20. Optical fiber according to claim 19, wherein said SBGs are centered on substantially different abscissae along said axis Z.

21. Optical fiber according to claim 19, wherein said SBGs have a substantially identical variation of said period along said axis Z, the variation being of the linear type.

22. Optical fiber according to claim 19, wherein said SBGs are configured to attenuate said wavelength by the order of −3 to −6 dB.

23. Optical fiber according to claim 19, wherein said periods $\Lambda_1$ and $\Lambda_2$ are equal to between 0.2 and 0.7 μm.

24. Optical fiber according to claim 19, wherein a length of each of said SBGs is equal to approximately 6 mm.

25. Optical fiber according to claim 19, wherein said SBGs are configured so that a polarization dependent loss incurred by a signal transmitted through the optical fiber is less than or equal to approximately 0.15 dB.

* * * * *